Figure 1:
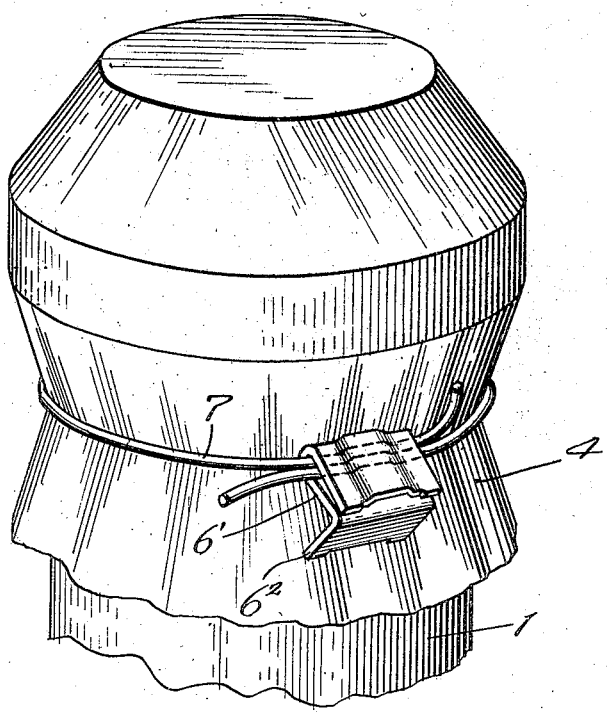

O. N. TEVANDER.
FASTENING CLIP.
APPLICATION FILED DEC. 23, 1920.

1,427,866.

Patented Sept. 5, 1922.

Inventor:
Olof N. Tevander
By C. L. Gragg
Atty.

Patented Sept. 5, 1922.

1,427,866

UNITED STATES PATENT OFFICE.

OLOF N. TEVANDER, OF CHICAGO, ILLINOIS.

FASTENING CLIP.

Application filed December 23, 1920. Serial No. 432,671.

*To all whom it may concern:*

Be it known that I, OLOF N. TEVANDER, citizen of the United States, residing at Chicago, in the county of Cook and State of Illinois, have invented a certain new and useful Improvement in Fastening Clips, of which the following is a full, clear, concise, and exact description.

My invention relates to clips for use in securing together the ends of tie strings and the like; the clip forming the subject matter of my invention being particularly adapted for mechanical application to and association with a tie element through the instrumentality of a machine described and claimed in my co-pending application Serial No. 318,680, filed August 20, 1919.

Figure 2:
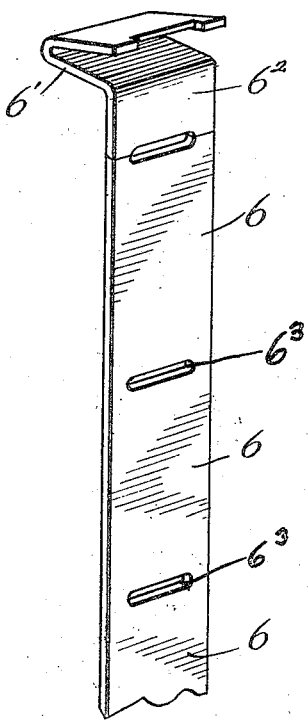
Figure 3:
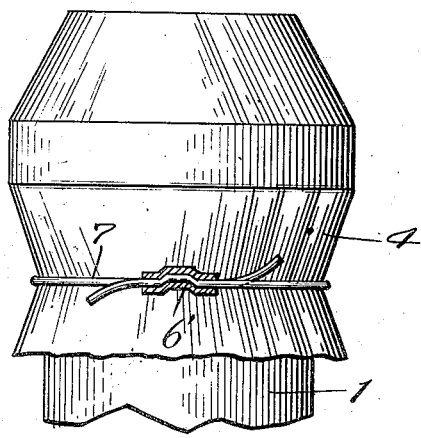

In the drawings chosen to illustrate my invention, the scope whereof is set forth in the appended claim:

Figure 1 is a perspective view of a corked bottle neck sealed by a closure cap applied by the machine of my aplication Ser. No. 318,680 and including my improved clip;

Figure 2, a view of a strip of metal from which my improved clips are formed and showing a partially formed clip at one end severed from the strip; and Figure 3, a view in elevation of what is shown in Figure 1, the clip being shown in cross section.

My improved clips are designed to be successively formed by my aforementioned machine from a metallic ribbon strip 6; the successive lengths of the strip required for the formation of each clip being determined by elongated transverse slots $6^3$ therein whereby the length of cut necessary in severing the section of the strip required for the formation of a clip is materially reduced.

While my clip is capable of use in connection with various types of receptacle seals I have shown the same associated with a seal for a corked bottle 1, the seal element employed being a sheet of suitable material 4 such as paper, light leather or the like, the skirt of which is bound by a tie element 7, desirably formed of wire, although any other suitable material may be utilized. The ends of the tie element are held together by means of my improved clip. This clip is of U-shape and includes the arms 6′ between which the ends of the tie element are passed and the arms then pressed together and upset in the manner shown in Fig. 3 to tightly secure the ends of the tie element; all of which operation is advantageously effected by my aforementioned machine. The formation of my clip is such that one of the arms 6′ is provided with a lateral extension $6^2$ at its free end which is adapted to be held by my machine, as set forth in my co-pending application, while the tie element is being applied and while the arms of the clip are pressed together and upset. The presence of the lateral extensions $6^2$ also prevents the use of pincers or pliers to reapply the clip in the event of its unlawful removal and thus enabling the clip to serve the additional purpose of guarding against the unwarranted use of the seal that is established by such a clip.

I claim:—

A U-shaped fastening clip comprising arms adapted to be squeezed into clamping engagement with overlapping ends of a tie element, one of said arms terminating in an outwardly directed lateral extension providing means for holding the clip while the tie element is passed between the arms thereof and while said arms are subsequently forced into clamping engagement with the tie element.

In witness whereof, I hereunto subscribe my name this first day of December, A. D. 1920.

OLOF N. TEVANDER.